United States Patent
Poolman

(10) Patent No.: US 11,137,173 B2
(45) Date of Patent: Oct. 5, 2021

(54) HOT GAS BYPASS FOR BATTERY PACK COLD START

(71) Applicant: CARRIER CORPORATION, Palm Beach Gardens, FL (US)

(72) Inventor: Ciara Poolman, Syracuse, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 304 days.

(21) Appl. No.: 16/309,970

(22) PCT Filed: Jun. 16, 2017

(86) PCT No.: PCT/US2017/037896
§ 371 (c)(1),
(2) Date: Dec. 14, 2018

(87) PCT Pub. No.: WO2017/218906
PCT Pub. Date: Dec. 21, 2017

(65) Prior Publication Data
US 2019/0128571 A1 May 2, 2019

Related U.S. Application Data
(60) Provisional application No. 62/351,698, filed on Jun. 17, 2016.

(51) Int. Cl.
F25B 13/00 (2006.01)
B60P 3/20 (2006.01)
(Continued)

(52) U.S. Cl.
CPC ......... *F25B 13/00* (2013.01); *B60H 1/00278* (2013.01); *B60P 3/20* (2013.01);
(Continued)

(58) Field of Classification Search
CPC ............... H01M 10/66; H01M 10/663; H01M 10/615; H01M 10/625; F25B 13/00;
(Continued)

(56) References Cited

U.S. PATENT DOCUMENTS 2,791,102 A * 5/1957 Kleist ................ B61D 27/0027
62/229
5,731,568 A 3/1998 Malecek
(Continued)

FOREIGN PATENT DOCUMENTS

| CN | 102632791 A | 8/2012 |
|---|---|---|
| CN | 203134927 U | 8/2013 |

(Continued)

OTHER PUBLICATIONS

George S. Bower & Keith Ritter; "BMW and LG Chem Trump Tesla in Battery Thermal Management"; https://www.hybridcars.com/bmw-and-lg-chem-trump-tesla-in-battery-thermal-management/; Dec. 7, 2015; 10 pages.
(Continued)

*Primary Examiner* — Jianying C Atkisson
*Assistant Examiner* — Miguel A Diaz
(74) *Attorney, Agent, or Firm* — Cantor Colburn LLP

(57) ABSTRACT

A transport refrigeration system (200) having: a refrigeration unit (22) configured to circulate refrigerant through a refrigeration circuit; a battery system (190) configured to power the refrigeration unit; and a heat transfer system (195) thermally connected to the battery system, the heat transfer system being configured to transfer heat from the flash tank to the battery system through the vaporized refrigerant. The refrigeration unit includes: a refrigerant compression device (32) having an inlet and an outlet; a refrigerant heat rejection heat exchanger (34) fluidly connected to the outlet; a flash tank (36) fluidly connected to the refrigerant heat rejection heat exchanger, the flash tank being configured to separate the refrigerant into a liquefied refrigerant and a vaporized
(Continued)

refrigerant; and a refrigerant heat absorption heat exchanger (38) fluidly connected to the flash tank and configured to receive the liquefied refrigerant from the flash tank, the refrigerant heat absorption heat exchanger being fluidly connected to the inlet.

14 Claims, 3 Drawing Sheets

(51) Int. Cl.
  *F25B 49/02* (2006.01)
  *F25D 11/00* (2006.01)
  *F25D 29/00* (2006.01)
  *F25B 27/00* (2006.01)
  *B60H 1/00* (2006.01)
  *H01M 10/66* (2014.01)

(52) U.S. Cl.
  CPC .............. *F25B 27/00* (2013.01); *F25B 49/02* (2013.01); *F25D 11/003* (2013.01); *F25D 29/003* (2013.01); *H01M 10/66* (2015.04); *F25B 2400/23* (2013.01); *F25B 2600/2509* (2013.01)

(58) Field of Classification Search
  CPC ...... F25B 27/00; F25B 49/02; F25B 2400/23; F25B 2600/2509; F25D 11/003; F25D 29/003; B60H 1/00278; B60H 1/00271; B60H 1/00295; B60H 1/00499; B60H 1/00492; B60H 1/005; B60H 2001/00307
  See application file for complete search history.

(56) References Cited

U.S. PATENT DOCUMENTS

| | | | | |
|---|---|---|---|---|
| 6,347,528 | B1* | 2/2002 | Iritani | B60L 3/0046 62/324.6 |
| 6,481,230 | B2* | 11/2002 | Kimishima | B60L 3/0046 62/239 |
| 7,147,071 | B2* | 12/2006 | Gering | B60L 58/27 237/12.3 B |
| 7,427,156 | B2 | 9/2008 | Ambrosio et al. | |
| 8,215,432 | B2 | 7/2012 | Nemesh et al. | |
| 8,288,048 | B2 | 10/2012 | Thompson | |
| 8,336,319 | B2* | 12/2012 | Johnston | B60K 1/00 62/79 |
| 8,410,760 | B2 | 4/2013 | Formanski et al. | |
| 8,899,062 | B2 | 12/2014 | Kadle et al. | |
| 9,007,205 | B2* | 4/2015 | Walker | B60R 25/30 340/539.16 |
| 9,016,080 | B2 | 4/2015 | Brodie et al. | |
| 9,533,544 | B2* | 1/2017 | Johnston | B60H 1/00278 |
| 10,427,491 | B2* | 10/2019 | Johnston | B60H 1/00385 |
| 10,436,495 | B2* | 10/2019 | Srichai | F25B 5/00 |
| 10,814,692 | B2* | 10/2020 | Kim | B60H 1/00921 |
| 2002/0043413 | A1* | 4/2002 | Kimishima | B60L 3/0053 180/68.1 |
| 2005/0167169 | A1* | 8/2005 | Gering | F01P 3/20 237/12.3 B |
| 2006/0064993 | A1* | 3/2006 | Tofflemire | B60H 1/00014 62/132 |
| 2008/0251235 | A1* | 10/2008 | Zhou | B60L 3/003 165/41 |
| 2009/0020620 | A1* | 1/2009 | Douarre | B60H 1/00492 237/12.3 R |
| 2009/0071178 | A1 | 3/2009 | Major et al. | |
| 2009/0317697 | A1* | 12/2009 | Dogariu | H01M 10/635 429/62 |
| 2010/0025006 | A1 | 2/2010 | Zhou | |
| 2010/0154449 | A1* | 6/2010 | Stover, Jr. | B60H 1/00428 62/236 |
| 2011/0072841 | A1* | 3/2011 | Arai | B60H 1/32281 62/259.2 |
| 2011/0113800 | A1* | 5/2011 | Sekiya | B60L 1/003 62/151 |
| 2011/0174561 | A1* | 7/2011 | Bowman | B60L 50/64 180/65.245 |
| 2011/0296855 | A1* | 12/2011 | Johnston | B60K 11/02 62/79 |
| 2012/0085114 | A1 | 4/2012 | Graaf et al. | |
| 2012/0222438 | A1* | 9/2012 | Osaka | B60L 58/26 62/126 |
| 2012/0234518 | A1* | 9/2012 | Brodie | F28D 20/028 165/104.31 |
| 2012/0297809 | A1* | 11/2012 | Carpenter | B60L 50/66 62/244 |
| 2012/0304674 | A1 | 12/2012 | Schwarzkopf | |
| 2013/0074525 | A1* | 3/2013 | Johnston | B60H 1/00385 62/56 |
| 2013/0118707 | A1 | 5/2013 | Kardos et al. | |
| 2013/0175022 | A1* | 7/2013 | King | B60H 1/00392 165/202 |
| 2013/0244066 | A1 | 9/2013 | Kang et al. | |
| 2013/0269911 | A1* | 10/2013 | Carpenter | B60H 1/143 165/104.13 |
| 2013/0298583 | A1* | 11/2013 | O'Donnell | B60H 1/143 62/115 |
| 2013/0319029 | A1* | 12/2013 | Sekiya | B60H 1/00899 62/238.7 |
| 2014/0193683 | A1 | 7/2014 | Mardall et al. | |
| 2014/0311180 | A1 | 10/2014 | Kawakami et al. | |
| 2014/0322563 | A1 | 10/2014 | Ketkar et al. | |
| 2015/0217623 | A1 | 8/2015 | Hatakeyama et al. | |
| 2015/0295285 | A1 | 10/2015 | Takeuchi et al. | |
| 2016/0087319 | A1 | 3/2016 | Roh et al. | |
| 2016/0116197 | A1* | 4/2016 | Takeuchi | F25B 5/04 62/276 |
| 2016/0280043 | A1* | 9/2016 | Duffy | B60H 1/3232 |
| 2017/0008375 | A1* | 1/2017 | Blatchley | H01M 10/625 |
| 2017/0028835 | A1* | 2/2017 | Worley | B60L 8/003 |
| 2017/0033336 | A1* | 2/2017 | Hoshino | H01M 2/1077 |
| 2017/0158081 | A1* | 6/2017 | Kim | H01M 10/613 |
| 2017/0174038 | A1* | 6/2017 | Scheldel | B60H 1/32284 |
| 2017/0292759 | A1* | 10/2017 | Al-Hallaj | F25D 11/022 |
| 2017/0297407 | A1* | 10/2017 | Shan | B60H 1/00385 |
| 2017/0297408 | A1* | 10/2017 | Kim | B60H 1/00899 |
| 2017/0358833 | A1* | 12/2017 | Jalilevand | B60H 1/00385 |
| 2018/0086224 | A1* | 3/2018 | King | H01M 10/613 |
| 2018/0147953 | A1* | 5/2018 | Lee | H01M 10/6555 |
| 2018/0178615 | A1* | 6/2018 | Xia | B60L 58/26 |
| 2019/0128571 | A1* | 5/2019 | Poolman | H01M 10/66 |
| 2019/0135075 | A1* | 5/2019 | Hwang | B60H 1/00278 |
| 2019/0195549 | A1* | 6/2019 | Pitsinki | F25D 3/125 |
| 2019/0323766 | A1* | 10/2019 | Poolman | F25B 7/00 |
| 2019/0331408 | A1* | 10/2019 | Poolman | B60H 1/00428 |
| 2019/0336899 | A1* | 11/2019 | Keller | B01D 46/0026 |
| 2020/0079208 | A1* | 3/2020 | Suzuki | H01M 10/66 |
| 2020/0122545 | A1* | 4/2020 | Lee | B60H 3/02 |
| 2020/0180391 | A1* | 6/2020 | Kim | B60H 1/00921 |
| 2020/0208900 | A1* | 7/2020 | Lavrich | B60H 1/00014 |
| 2020/0309440 | A1* | 10/2020 | Poolman | B60H 1/3232 |

FOREIGN PATENT DOCUMENTS

| | | |
|---|---|---|
| CN | 103996889 A | 8/2014 |
| CN | 104157928 A | 11/2014 |
| CN | 204801534 U | 11/2015 |
| EP | 1110771 A1 | 6/2001 |
| EP | 2933584 A1 | 10/2015 |
| JP | S57161454 A | 10/1982 |
| WO | 2008140454 A1 | 11/2008 |
| WO | 2012138497 A1 | 10/2012 |

OTHER PUBLICATIONS

Notification of Transmilltal of the International Search report and the Written Opinion of the International Searching Authority, or the

(56) References Cited

OTHER PUBLICATIONS

Declaration for International Application No. PCT/US2017/037896; Report dated Sep. 12, 2017.
Chinese First Office Action for Application No. 201780042456.6; Report dated Jun. 22, 2020; 13 pages.

* cited by examiner

HOT GAS BYPASS FOR BATTERY PACK COLD START

BACKGROUND OF THE DISCLOSURE

The embodiments herein generally relate to "all electric" transport refrigeration systems and more specifically, a method and apparatus for operating such systems.

Typically, transport refrigeration systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, transport refrigeration systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated transport containers include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated transport containers, the compressor, and typically other components of the refrigeration unit, must be powered during transit by a prime mover. In the case of refrigerated transport containers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An "all electric" transport refrigeration system for a refrigerated transport container application is also commercially available through Carrier Corporation. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the refrigeration unit and also powering electric AC fan motors for driving the condenser and evaporator motors and electric heaters associated with the evaporator. For example, U.S. Pat. No. 6,223,546 discloses an all electric transport refrigeration system.

It is desirable to have a refrigeration system that may operate in a cold weather environment with or without a prime mover.

BRIEF DESCRIPTION OF THE DISCLOSURE

According to one embodiment, a transport refrigeration system is provided. The transport refrigeration system having: a refrigeration unit configured to circulate refrigerant through a refrigeration circuit. The refrigeration unit includes: a refrigerant compression device having an inlet and an outlet; a refrigerant heat rejection heat exchanger fluidly connected to the outlet; a flash tank fluidly connected to the refrigerant heat rejection heat exchanger, the flash tank being configured to separate the refrigerant into a liquefied refrigerant and a vaporized refrigerant; and a refrigerant heat absorption heat exchanger fluidly connected to the flash tank and configured to receive the liquefied refrigerant from the flash tank, the refrigerant heat absorption heat exchanger being fluidly connected to the inlet. The refrigeration system further includes a battery system configured to power the refrigeration unit; and a heat transfer system thermally connected to the battery system, the heat transfer system being configured to transfer heat from the flash tank to the battery system through the vaporized refrigerant.

In addition to one or more of the features described above, or as an alternative, further embodiments of the transport refrigeration system may include that the battery system further includes a plurality of battery modules.

In addition to one or more of the features described above, or as an alternative, further embodiments of the transport refrigeration system may include that the heat transfer system further includes a plurality of heat transfer plates. Each of plurality of the battery modules is interposed between at least two heat transfer plates. The heat transfer plates being thermally connected with the battery modules.

In addition to one or more of the features described above, or as an alternative, further embodiments of the transport refrigeration system may include a controller configured to regulate the flow of vaporized refrigerant from the flash tank to the heat transfer system.

In addition to one or more of the features described above, or as an alternative, further embodiments of the transport refrigeration system may include that the battery system is integrally attached to a refrigerated transport container of the transport refrigeration system.

In addition to one or more of the features described above, or as an alternative, further embodiments of the transport refrigeration system may include that the battery system is integrally attached to a drop deck configured to carry a refrigerated transport container of the transport refrigeration system. The drop deck being releasably connected to the refrigerated transport container.

In addition to one or more of the features described above, or as an alternative, further embodiments of the transport refrigeration system may include that the battery system is integrally attached to a tractor configured to pull a refrigerated transport container of the transport refrigeration system. The tractor being releasably connected to the refrigerated transport container.

In addition to one or more of the features described above, or as an alternative, further embodiments of the transport refrigeration system may include that the battery system is composed of at least one of a lithium ion battery, a nickel-metal hydride battery, an alkaline battery, a nickel-hydrogen battery, and a lead-acid battery.

According to another embodiment, a method of operating a refrigeration unit of a transport refrigeration system is provided. The method includes the steps of: circulating, using the refrigeration unit, a refrigerant through a refrigeration circuit. The refrigeration unit includes: a refrigerant compression device having an inlet and an outlet; a refrigerant heat rejection heat exchanger fluidly connected to the outlet; a flash tank fluidly connected to the refrigerant heat rejection heat exchanger, the flash tank being configured to separate the refrigerant into a liquefied refrigerant and a vaporized refrigerant; and a refrigerant heat absorption heat exchanger fluidly connected to the flash tank and configured to receive the liquefied refrigerant from the flash tank, the refrigerant heat absorption heat exchanger being fluidly connected to the inlet. The method further includes the steps of: powering, using a battery system, the refrigeration unit; and heating, using a heat transfer system, the battery system. The heat transfer system being configured to transfer heat from the flash tank to the battery system through the vaporized refrigerant.

In addition to one or more of the features described above, or as an alternative, further embodiments of the method may include that the battery system further includes: a plurality of battery modules.

In addition to one or more of the features described above, or as an alternative, further embodiments of the method may include that the heat transfer system further includes: a plurality of heat transfer plates. Each of plurality of the battery modules is interposed between at least two heat transfer plates. The heat transfer plates being thermally connected with the battery modules.

In addition to one or more of the features described above, or as an alternative, further embodiments of the method may include that the transport refrigeration system further includes a controller configured to regulate the flow of vaporized refrigerant from the flash tank to the heat transfer system.

In addition to one or more of the features described above, or as an alternative, further embodiments of the method may include that the battery system is integrally attached to a refrigerated transport container of the transport refrigeration system.

In addition to one or more of the features described above, or as an alternative, further embodiments of the method may include that the battery system is integrally attached to a drop deck configured to carry a refrigerated transport container of the transport refrigeration system. The drop deck being releasably connected to the refrigerated transport container.

In addition to one or more of the features described above, or as an alternative, further embodiments of the method may include that the battery system is integrally attached to a tractor configured to pull a refrigerated transport container of the transport refrigeration system. The tractor being releasably connected to the refrigerated transport container.

In addition to one or more of the features described above, or as an alternative, further embodiments of the method may include that the battery system is composed of at least one of a lithium ion battery, a nickel-metal hydride battery, an alkaline battery, a nickel-hydrogen battery, and a lead-acid battery.

According to another embodiment, a controller for a refrigeration unit of a transport refrigeration system includes: a processor; a memory comprising computer-executable instructions that, when executed by the processor, cause the processor to perform operations. The operations including: circulating, using the refrigeration unit, a refrigerant through a refrigeration circuit. The refrigeration unit including: a refrigerant compression device having an inlet and an outlet; a refrigerant heat rejection heat exchanger fluidly connected to the outlet; a flash tank fluidly connected to the refrigerant heat rejection heat exchanger, the flash tank being configured to separate the refrigerant into a liquefied refrigerant and a vaporized refrigerant; and a refrigerant heat absorption heat exchanger fluidly connected to the flash tank and configured to receive the liquefied refrigerant from the flash tank, the refrigerant heat absorption heat exchanger being fluidly connected to the inlet. The operations further include: powering, using a battery system, the refrigeration unit; and heating, using a heat transfer system, the battery system, the heat transfer system being configured to transfer heat from the flash tank to the battery system through the vaporized refrigerant.

In addition to one or more of the features described above, or as an alternative, further embodiments of the controller may include that the battery system further comprises a plurality of battery modules.

In addition to one or more of the features described above, or as an alternative, further embodiments of the controller may include that the heat transfer system further includes: a plurality of heat transfer plates. Each of plurality of the battery modules is interposed between at least two heat transfer plates. The heat transfer plates being thermally connected with the battery modules.

In addition to one or more of the features described above, or as an alternative, further embodiments of the controller may include that the battery system is integrally attached to a refrigerated transport container of the transport refrigeration system.

In addition to one or more of the features described above, or as an alternative, further embodiments of the controller may include that the battery system is integrally attached to a drop deck configured to carry a refrigerated transport container of the transport refrigeration system. The drop deck being releasably connected to the refrigerated transport container.

In addition to one or more of the features described above, or as an alternative, further embodiments of the controller may include that the battery system is integrally attached to a tractor configured to pull a refrigerated transport container of the transport refrigeration system. The tractor being releasably connected to the refrigerated transport container.

In addition to one or more of the features described above, or as an alternative, further embodiments of the controller may include that the battery system is composed of at least one of a lithium ion battery, a nickel-metal hydride battery, an alkaline battery, a nickel-hydrogen battery, and a lead-acid battery.

Technical effects of embodiments of the present disclosure include heating up a battery system to more efficiently power a refrigeration unit using vaporized refrigerant from the refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
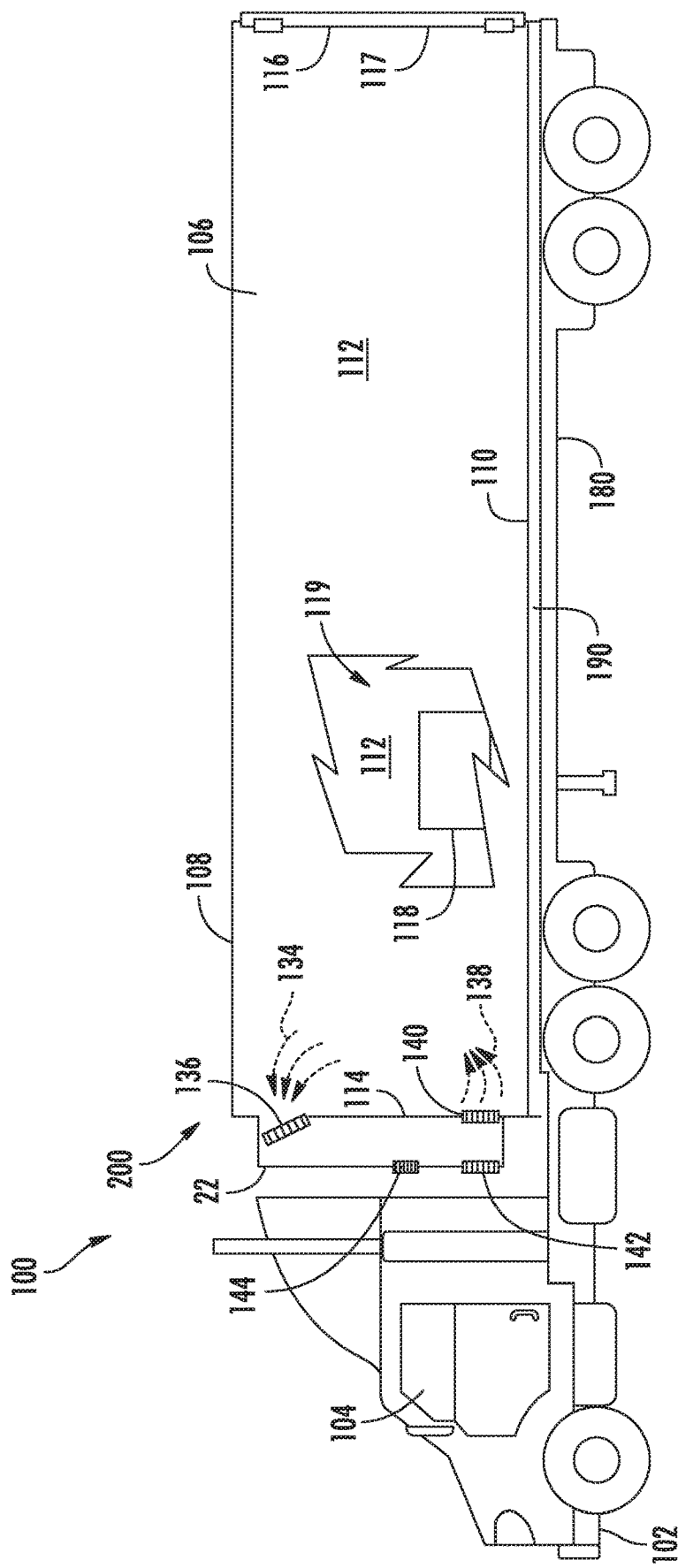
FIG. 1 is a schematic illustration of a transport refrigeration system, according to an embodiment of the present disclosure.
Figure 2:
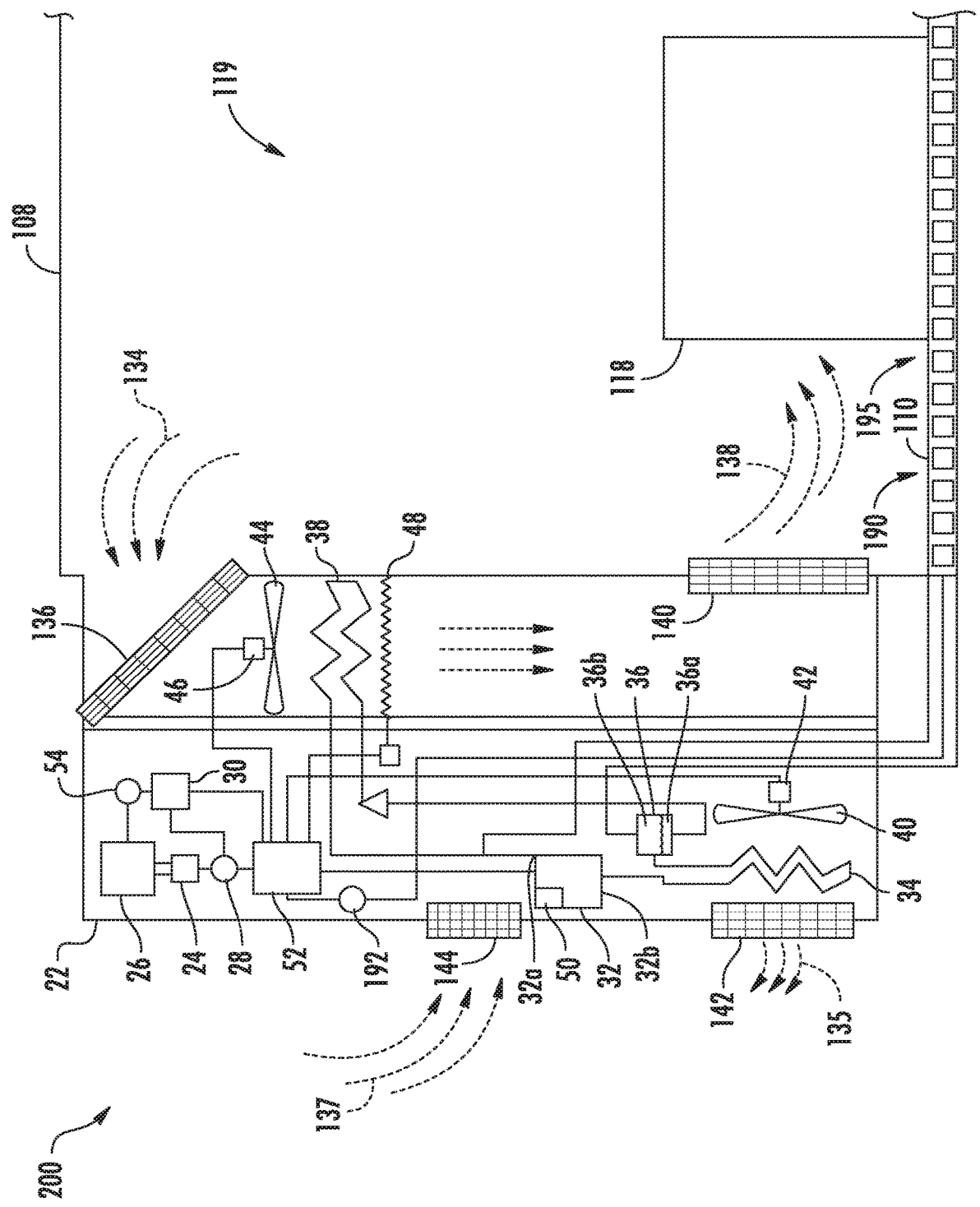
FIG. 2 is an enlarged schematic illustration of the transport refrigeration system of FIG. 1, according to an embodiment of the present disclosure.
Figure 3:
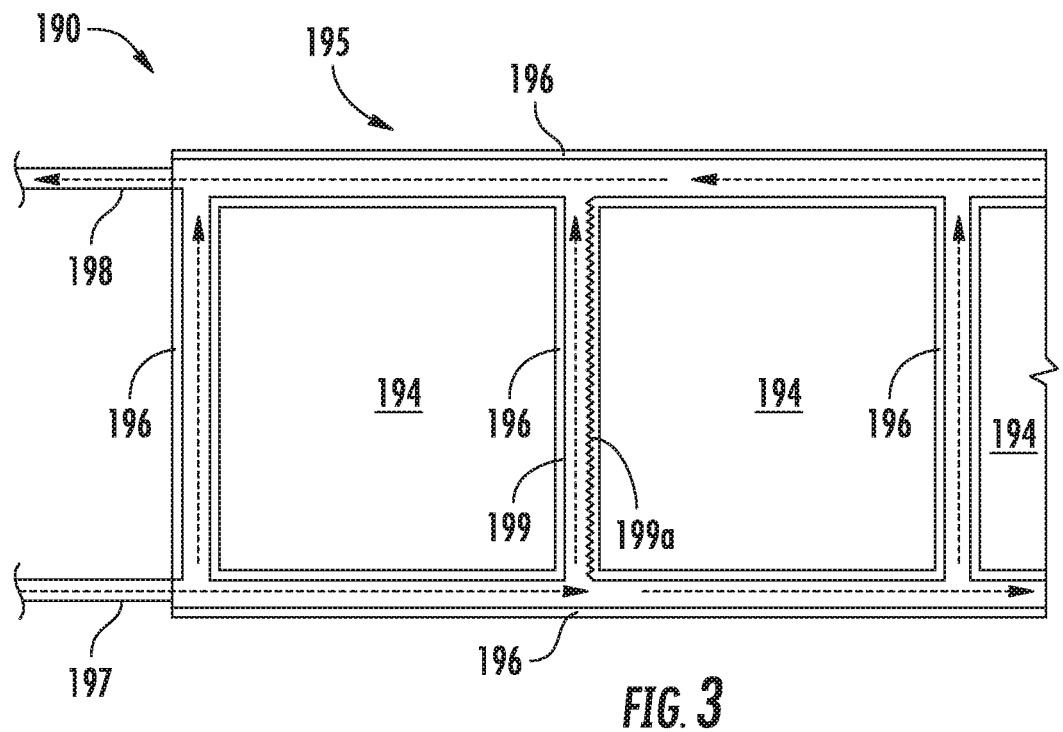
FIG. 3 is an enlarged schematic illustration of a battery system and a heat transfer system of the transport refrigeration system of FIG. 1, according to an embodiment of the present disclosure.

Referring to FIGS. 1-3, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure. FIG. 3 shows an enlarged schematic illustration of a battery system 190 and a heat transfer system 195 of the transport refrigeration system 200 of FIG. 1, according to an embodiment of the present disclosure. The transport refrigeration system 200 is being illustrated as a trailer system 100 as seen in FIG. 1. It is appreciated by those of skill in the art that embodiments described herein may be applied to any transport refrigeration system such as, for example shipping containers that are shipped by rail, sea, or any other suitable container, without use of a tractor 102. The trailer system 100 includes a tractor 102 and a refrigerated transport container 106. The tractor 102 includes an operator's compartment or cab 104 and an engine (not shown), which acts as the drive system of the trailer system 100. The refrigerated transport container 106 is coupled or releasably connected to the tractor 102. The refrigerated transport container 106 is a refrigerated trailer and includes a top wall 108, a directly opposed bottom wall 110, opposed side walls 112, and a front wall 114, with the front wall 114 being closest to the tractor 102. The refrigerated transport container 106 further includes a door or doors 117 at a rear wall 116, opposite the front wall 114. The walls of the refrigerated transport container 106 define a refrigerated cargo space 119.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring refrigerated transport. The transport refrigeration system 200 includes a refrigeration unit 22, a power source, and a controller 30. The power source may be a prime mover 26 for driving an electric generation device 24 and/or a battery system 190. If the refrigeration system 200 does utilize a prime mover 26, the prime mover 26 and the electric generation device 24 may be a part of the refrigeration system 200 or may be an external power source located on a tractor 102 or a ship transporting the refrigeration system 200. The refrigeration unit 22 functions, under the control of the controller 30, to establish and regulate a desired environmental parameters such as, for example temperature, pressure, humidity, carbon dioxide, ethylene, ozone, light exposure, vibration exposure, and other conditions in the interior compartment 119 as known to one of ordinary skill in the art. In an embodiment, the refrigeration unit 22 is a refrigeration system capable of providing a desired temperature and humidity range.

The refrigeration unit 22 includes a refrigerant compression device 32 having an inlet 32a and an outlet 32b, a refrigerant heat rejection heat exchanger 34, a flash tank 36, and a refrigerant heat absorption heat exchanger 38 connected in refrigerant flow communication in a closed loop refrigerant circuit and arranged in a conventional refrigeration cycle. The flash tank 36 reduces the pressure of the refrigerant while separating the refrigerant out into a liquefied refrigerant 36a and a vaporized refrigerant 36b. The liquefied refrigerant 36a flows to the refrigerant heat absorption heat exchanger 38 while the vaporized refrigerant 36b flows to the heat transfer system heat transfer system 195. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the prime mover 26, typically through an electronic engine controller 54 operatively associated with the prime mover 26. The controller 30 may also be able to selectively operate the battery system 190. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

The prime mover 26, which comprises a fossil-fuel engine, most commonly a diesel engine, drives the electric generation device 24 that generates electrical power. The drive shaft of the engine drives the shaft of the electric generation device 24. In an electrically powered embodiment of the refrigeration unit 20, the electric generation device 24 may comprise an engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at least one voltage. Some electric generation devices may have internal voltage regulators while other electric generation devices do not. As each of the fan motors 42, 46 and the compression device drive motor 50 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

In the illustrated embodiment, the transport refrigeration system 200 includes a battery system 190, as seen in FIGS. 1 and 2. The battery system 190 is configured to power the refrigeration unit 22. The battery system 190 may provide supplemental power in addition to the power generated by the prime mover 26 or the battery system 190 may be large enough to power the entire refrigeration unit 22. Thus, the refrigeration unit 22 may be powered by the prime mover 26 and/or the battery system 190. The battery system 190 may comprise at least one of a lithium ion battery, a nickel-metal hydride battery, an alkaline battery, a nickel-hydrogen battery, and a lead-acid battery. The battery system 190 may include a voltage regulator 192 to sense and/or regulate the voltage of the battery system 190. In the illustrated embodiment, the battery system 190 may be composed of a plurality of battery modules 194, as seen in FIG. 3.

Further, the heat transfer system 195 is thermally connected to the battery system 190. The heat transfer system 195 is configured to transfer heat from the flash tank 36 to the battery system 190 through the vaporized refrigerant 36b. The vaporized refrigerant 36b flows through the heat transfer system 195 and heats up the battery system 190. Advantageously, heating up a battery system promotes more efficient operation of the battery system. The heat may transfer from the heat transfer system 195 to the battery system 190 through thermal conduction or convection. In the illustrated embodiment, the heat is transferred via convection between the heat transfer system 195 and the battery system 190. In the illustrated embodiment, the heat transfer system 195 may be composed of a plurality of heat transfer plates 196, as seen in FIG. 3. Each of plurality of the battery modules 194 may be interposed between at least two heat transfer plates 196, as seen in FIG. 3. The heat transfer plates 196 are thermally connected with the battery modules 194. The vaporized refrigerant 36b may enter the heat transfer system 195 through a vapor inlet 197 and travel through the plurality of heat transfer plates 196 through an interconnected network of tubes 199 and then exit the heat transfer system 195 through a vapor outlet 198. The network of tubes may include ridges 199a to increase the efficiency of the between the heat transfer plates 196 and the battery modules 194. For simplicity, the ridges 199a are only shown on a portion of the heat transfer plate 196 but may cover a larger portion of the heat transfer plate. The ridges 199a may be configured as a saw tooth pattern, as shown in FIG. 3, or any additional pattern to optimize heat transfer known to one of skill in the art. Upon exiting the heat transfer system 195, the vaporized refrigerant 36b will travel back to the inlet 32a of the refrigerant compression device 32.

In the illustrated embodiment, the battery system 190 is integrally attached to the refrigerated transport container 106 of the transport refrigeration system 200 and located proximate the bottom wall 110 of the refrigerated transport container 106. The battery system 190 may be integrally attached to the refrigerated transport container 106 at various other locations, including but not limited to proximate the top wall 108, proximate the rear wall 116, proximate the front wall 114, or within the refrigerated cargo space 119. In another embodiment, the battery system 190 is integrally attached to a drop deck 180 configured to carry the refrigerated transport container 106 of the transport refrigeration system 200. The drop deck 180 is releasably connected to the refrigerated transport container 106. In another embodiment, the battery system 190 may be integrally attached to a tractor 102 configured to pull a refrigerated transport container 106 of the transport refrigeration system 200. The tractor 102 being releasably connected to the refrigerated transport container 106.

Airflow is circulated into and through the refrigerate cargo space 119 of the refrigerated transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the refrigerated transport container 106 through the refrigeration unit outlet 140, which in some embodiments is located near the bottom wall 110 of the container system 106. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 cools the perishable goods 118 in the refrigerated cargo space 119 of the refrigerated transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

Figure 4:
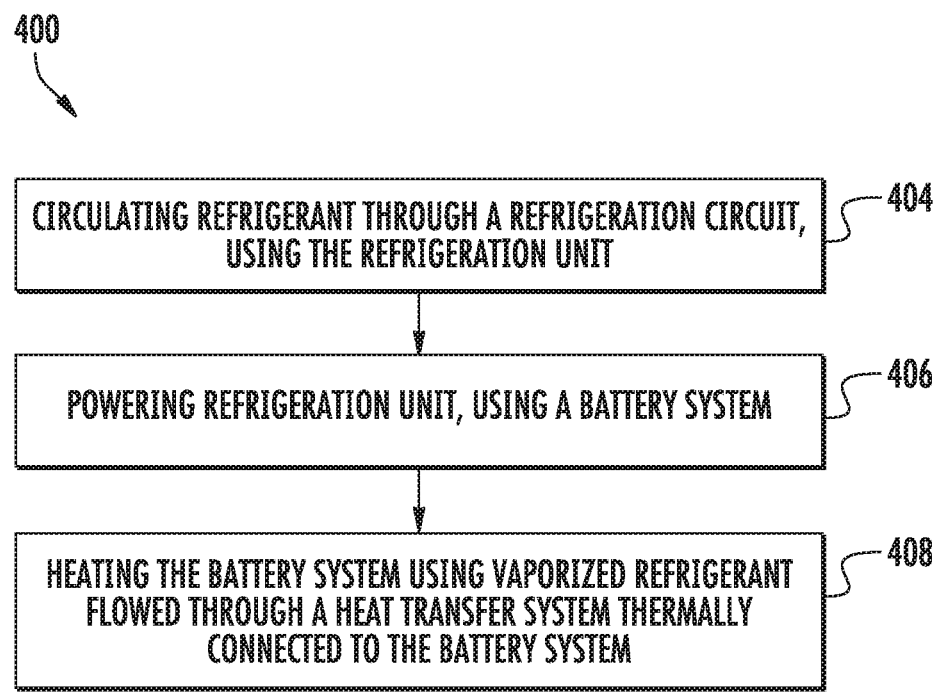
FIG. 4 is a flow diagram illustrating a method of operating a refrigeration unit of the transport refrigeration system of FIG. 1, according to an embodiment of the present disclosure.

Referring now also to FIG. 4, which shows a flow diagram illustrating a method 400 of operating the refrigeration unit 22 of the transport refrigeration system 200 of FIG. 1. At block 404, the refrigeration unit 22 circulates a refrigerant through a refrigeration circuit, as seen in FIG. 2. As discussed above, the refrigeration unit 22 comprises: the refrigerant compression device 32 having the inlet 32a and the outlet 32b; the refrigerant heat rejection heat exchanger 34 fluidly connected to the outlet 32b; and the flash tank 36 fluidly connected to the refrigerant heat rejection heat exchanger 34. The flash tank is configured to separate the refrigerant into a liquefied refrigerant 36a and a vaporized refrigerant 36b. The refrigeration unit 22 further comprises: the refrigerant heat absorption heat exchanger 38 fluidly connected to the flash tank 36 and configured to receive the liquefied refrigerant 36a from the flash tank 36. The refrigerant heat absorption heat exchanger 38 is also fluidly connected to the inlet 32a. Next at block 406, method 400 includes the battery system 190 powers the refrigeration unit 22. Further at block 408, the heating system heats the battery system 190. In an embodiment, the heating system may send heat to the battery system 190 when the battery temperature reaches a first selected temperatures and/or the external temperature reaches a second selected temperature. The battery system 190 may be heated to a selected temperature, as controlled by the controller 30. The selected temperature may be an optimum performance temperature of the battery system 190. The controller 30 may control the temperature of the battery system 190 by regulating the flow of vaporized refrigerant 36b from the flash tank 36 to the heat transfer system 195. The battery system 190 may also contain temperature sensors (not shown) to sense the temperature of the battery system 190. The temperature sensors may be in operative communication with the controller 30.

While the above description has described the flow process of FIG. 4 in a particular order, it should be appreciated that unless otherwise specifically required in the attached claims that the ordering of the steps may be varied.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A transport refrigeration system comprising:
    a refrigeration unit configured to circulate refrigerant through a refrigeration circuit, the refrigeration unit comprising:
    a refrigerant compression device having an inlet and an outlet;
    a refrigerant heat rejection heat exchanger fluidly connected to the outlet;
    a flash tank fluidly connected to the refrigerant heat rejection heat exchanger, the flash tank being configured to separate the refrigerant into a liquefied refrigerant and a vaporized refrigerant, wherein the flash tank comprises a first exit for the liquefied refrigerant and a second exit for the vaporized refrigerant, the second exit being different than the first exit; and
    a refrigerant heat absorption heat exchanger fluidly connected to the flash tank and configured to receive the liquefied refrigerant from the flash tank, the refrigerant heat absorption heat exchanger being fluidly connected to the inlet; and
    a battery system configured to power the refrigeration unit, the battery system comprising a plurality of battery modules; and
    a heat transfer system thermally connected to the battery system, the heat transfer system being configured to transfer heat from the flash tank to the battery system through the vaporized refrigerant,
    wherein the heat transfer system further comprises:
    a plurality of heat transfer plates, wherein each of the plurality of battery modules is interposed between at least two of the plurality of heat transfer plates, the plurality of heat transfer plates being thermally connected with the battery modules,
    wherein the vaporized refrigerant is configured to flow from the flash tank through the plurality of heat transfer plates.

2. The transport refrigeration system of claim 1, further comprising:
    a controller configured to regulate the flow of vaporized refrigerant from the flash tank to the heat transfer system.

3. The transport refrigeration system of claim 1, wherein:
    the battery system is integrally attached to a refrigerated transport container of the transport refrigeration system.

4. The transport refrigeration system of claim 1, wherein:
    the battery system is integrally attached to a drop deck configured to carry a refrigerated transport container of the transport refrigeration system, the drop deck being releasably connected to the refrigerated transport container.

5. The transport refrigeration system of claim 1, wherein:
the battery system is integrally attached to a tractor configured to pull a refrigerated transport container of the transport refrigeration system, the tractor being releasably connected to the refrigerated transport container.

6. The transport refrigeration system of claim 1, wherein:
the battery system is composed of at least one of a lithium ion battery, a nickel-metal hydride battery, an alkaline battery, a nickel-hydrogen battery, and a lead-acid battery.

7. A method of operating a refrigeration unit of a transport refrigeration system, the method comprising:
circulating, using the refrigeration unit, a refrigerant through a refrigeration circuit, the refrigeration unit comprising:
a refrigerant compression device having an inlet and an outlet;
a refrigerant heat rejection heat exchanger fluidly connected to the outlet;
a flash tank fluidly connected to the refrigerant heat rejection heat exchanger, the flash tank being configured to separate the refrigerant into a liquefied refrigerant and a vaporized refrigerant, wherein the flash tank comprises a first exit for the liquefied refrigerant and a second exit for the vaporized refrigerant, the second exit being different than the first exit; and
a refrigerant heat absorption heat exchanger fluidly connected to the flash tank and configured to receive the liquefied refrigerant from the flash tank, the refrigerant heat absorption heat exchanger being fluidly connected to the inlet; and
powering, using a battery system, the refrigeration unit, the battery system comprising a plurality of battery modules; and
heating, using a heat transfer system, the battery system, the heat transfer system being configured to transfer heat from the flash tank to the battery system through the vaporized refrigerant,
wherein the heat transfer system further comprises:
a plurality of heat transfer plates, wherein each of the plurality of the battery modules is interposed between at least two of the plurality of heat transfer plates, the plurality of heat transfer plates being thermally connected with the battery modules,
wherein the vaporized refrigerant is configured to flow front the flash tank through the plurality of heat transfer plates.

8. The method of claim 7, wherein the transport refrigeration system further comprises:
a controller configured to regulate the flow of vaporized refrigerant from the flash tank to the heat transfer system.

9. The method of claim 7, wherein:
the battery system is integrally attached to a refrigerated transport container of the transport refrigeration system.

10. The method of claim 7, wherein:
the battery system is integrally attached to a drop deck configured to carry a refrigerated transport container of the transport refrigeration system, the drop deck being releasably connected to the refrigerated transport container.

11. The method of claim 7, wherein:
the battery system is integrally attached to a tractor configured to pull a refrigerated transport container of the transport refrigeration system, the tractor being releasably connected to the refrigerated transport container.

12. The method of claim 7, wherein:
the battery system is composed of at least one of a lithium ion battery, a nickel-metal hydride battery, an alkaline battery, a nickel-hydrogen battery, and a lead-acid battery.

13. A controller for a refrigeration unit of a transport refrigeration system comprising:
a processor;
a memory comprising computer-executable instructions that, when executed by the processor, cause the processor to perform operations, the operations comprising:
circulating, using the refrigeration unit, a refrigerant through a refrigeration circuit, the refrigeration unit comprising:
a refrigerant compression device having an inlet and an outlet;
a refrigerant heat rejection heat exchanger fluidly connected to the outlet;
a flash tank fluidly connected to the refrigerant heat rejection heat exchanger, the flash tank being configured to separate the refrigerant into a liquefied refrigerant and a vaporized refrigerant, wherein the flash tank comprises a first exit for the liquefied refrigerant and a second exit for the vaporized refrigerant, the second exit being different than the first exit; and
a refrigerant heat absorption heat exchanger fluidly connected to the flash tank and configured to receive the liquefied refrigerant from the flash tank, the refrigerant heat absorption heat exchanger being fluidly connected to the inlet; and
powering, using a battery system, the refrigeration unit, the battery system comprising a plurality of battery modules; and
heating, using a heat transfer system, the battery system, the heat transfer system being configured to transfer heat from the flash tank to the battery system through the vaporized refrigerant,
wherein the heat transfer system further comprises:
a plurality of heat transfer plates, wherein each of the plurality of the battery modules is interposed between at least two of the plurality of heat transfer plates, the plurality of heat transfer plates being thermally connected with the batter modules;
wherein the vaporized refrigerant is configured to flow from the flash tank through the plurality of heat transfer plates.

14. The controller of claim 13, wherein:
the battery system is integrally attached to a refrigerated transport container of the transport refrigeration system.

* * * * *